United States Patent

Heine et al.

[15] 3,666,275

[45] May 30, 1972

[54] PHONOGRAPH APPARATUS

[72] Inventors: John C. Heine, Cambridge; Edward M. Kerwin, Jr., Weston, both of Mass.; Colin G. Gordon, Ayr, Scotland

[73] Assignee: Bolt Beranek and Newman, Inc., Cambridge, Mass.

[22] Filed: Jan. 23, 1970

[21] Appl. No.: 5,349

Related U.S. Application Data

[63] Continuation of Ser. No. 613,874, Feb. 3, 1967, abandoned.

[52] U.S. Cl. ..... 274/11 R, 274/1 A

[51] Int. Cl. ..... G11b 25/06

[58] Field of Search ..... 274/1 A, 11, 43

[56] References Cited

UNITED STATES PATENTS 3,582,084 6/1971 Ryan et al. ..... 274/11

1,979,067 10/1934 Franklin ..... 274/1.1

*Primary Examiner*—Harry N. Haroian
*Attorney*—Rines & Rines

[57] ABSTRACT

This invention embodies a linearly driven phonograph record tape having substantially parallel record grooves, and a novel apparatus for selecting the groove to be played by appropriate spring-drive tensioning means.

5 Claims, 1 Drawing Figure

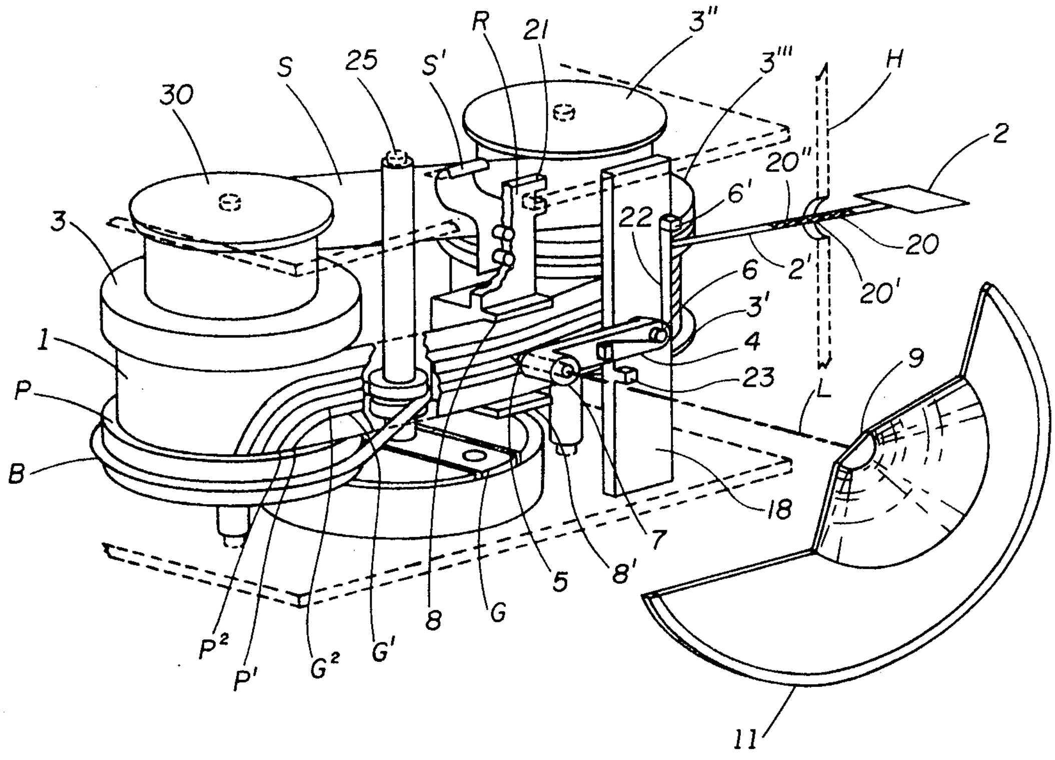
JOHN C. HEINE
EDWARD M. KERWIN, JR
COLIN G. GORDON INVENTORS
BY Rines and Rines
ATTORNEYS

PHONOGRAPH APPARATUS

This application is a continuation of Ser. No. 613,874, filed Feb. 3, 1967 for "Phonograph Apparatus", now abandoned.

The present invention relates to phonograph apparatus and, more particularly, to inexpensive sound-powered reproducing systems for use in "speaking" dolls or similar applications; though it is to be understood that certain of the novel features of the invention are more broadly applicable to other types of sound-reproducing systems, as well.

Treating, first, with those applications of the invention in the toy or similar fields before mentioned, it has heretofore been proposed to imbue a doll or similar device with an audible message-reproducing capability by providing a phonograph record which may be played by a needle mechanically coupled to a sound-reproducing loudspeaker device, the apparatus being activated by the pulling of a drawstring or the like which tensions a spring device for powering the movement of the record against the needle. Unfortunately, however, devices of this character have heretofore inherently required the use of circular record discs and needle mounting structures and the like suitable for operation therewith, thus not only seriously limiting the number of multiple messages and length of messages that may be recorded on a small-sized record, but introducing serious problems of quality of reproduction as a result of the relatively slow speed of disc rotation inherent in such devices. In addition, prior art devices have employed structures in which the tone arm, disposed between the needle holder and the sound-reproducing means, is provided with a slidable coupling containing a substance (such as grease and the like) which will allow the alternating-current vibrations from the needle as it engages the recorded areas of the record grooves to be coupled from the tone arm to the sound-reproducing loudspeaker, but permits different static or d.c. positioning of the needle. The requirement for this kind of coupling between the loudspeaker and the tone arm has introduced certain complexities in construction and certain limitations in the transmission of acoustic energy between the tone arm and the sound-reproducing loudspeaker at regions remote from the region of greatest vibration at the needle. Recording devices of this character, moreover, have also been subject to the disadvantage that the position where the needle plays upon the disc record after each successive operation of the spring tensioning draw-string is a matter of random chance, such that the user may get the same message repeated several times before the needle returns to a different recorded message. The user thus is unable to select different messages at will in accordance with these prior constructions.

An object of the present invention, on the other hand, is to provide a new and improved phonograph apparatus of the above-described nature which shall not be subject to any of the above-described disadvantages but, to the contrary, removes the inherent restrictions accompanying the use of circular disc records and, if desired, the uncertainty of selection of desired recorded messages thereon.

A further object is to provide a novel phonograph record and a novel apparatus of more general utility, as well.

Other and further objects will be hereinafter pointed out and more particularly delineated in the appended claims.

In summary, however, the improvements over the prior art previously mentioned are attained with the aid of a longitudinally extending record strip provided with longitudinal grooves and operating with a novel pivotal connection of the tone arm with the sound-reproducing loudspeaker. The spring-tensioning drawstring means serves the further function of positioning the needle to different predetermined positions along the record strip in order to enable selection of the desired message. Preferred constructional details and novel subcombination features that are useful apart from the complete system, are hereinafter more fully explained.

The invention will now be described with reference to the accompanying drawing, the single FIGURE of which is a perspective view, partly sectionalized to illustrate details of construction and showing the invention in a preferred form.

A record strip 1 is shown in the form of a planar tape ( as of plastic ) wound between a power or driving reel 3 and a takeup or supply reel 3', which together constitute drive means for moving the tape 1 substantially linearly either to the left past a pressure plate R at a predetermined region of which a reproducing needle 5 is disposed, engaging the record grooves $G_1$, $G_2$, etc. ; or to the right, for rewinding. The use of such a linear tape record obviates the limited record messages, reproduction quality difficulties and other disadvantages inherent in the disc records previously discussed, since numerous parallel longitudinal record grooves can be provided in a small space with all grooves moving at the same speed, providing uniform reproducing of the sound. The successive substantially parallel grooves $G_1$, $G_2$, etc., may each have a different recorded message and may commence at successive longitudinal positions $P_1$, $P_2$, etc., along the bottom or some other predetermined region of the tape 1.

The power for driving the tape 1 past the region R is supplied by a spring S, shown in the preferred form of the well-known "Negator" type, which may be wound from the storage drum 3'' ( on the same shaft as, but rotatably separate from the take-up reel 3' ) upon an upper extension 30 of the power reel 3. This tensioning may be effected by the pulling of tab 2 connected with a drawstring 2' wound about a spool 3''' carried by the take-up reel 3'. As the tab 2 is pulled, the drawstring 2' tensions the spring S and simultaneously rewinds the tape 1 from the power reel 3 upon the take-up reel 3'. Upon release of the tab 2, the spring S provides power for driving the system 3–3' so that the tape record 1 is linearly moved past the region R, to the left, with the needle 5 engaging, for example, the groove $G_1$, and transmitting the resulting alternating-current vibrations to the tone arm cylinder 7. The tape 1 passes across the pressure plate R in the region between upper and lower guides 8 and 8'. The plate R is pivoted at its upper end 21 with positive outward pressure applied by a rearwardly connected leaf spring S' which resiliently presses the tape 1 against the needle 5 and the tone arm 7 against the later-described speaker cone 9 during the playing of the tape record 1. During the rewind, the tension upon the tape 1, effected as its rewinding stores energy in the spring S, pushes against the spring S' and overcomes its effect, withdrawing or separating the tape 1 from the needle 5 during the tape rewind.

In accordance with the preferred embodiment of the invention, the right-hand end of the tone arm 7 is mechanically pressed against the inner cone region 9 of a sound-reproducing device, such as the convoluted conical loudspeaker 11, thereby to transmit the sounds recorded in the groove $G_1$ into space. The speaker 11 is shown apart from the tone arm 7 in the drawing in order not to complicate the same; it being understood, however, that the elements 7 and 9 are pressed together in actual practice, as schematically illustrated by the dash line L.

The needle 5 is shown rigidly mounted at the end of the tone arm 7, permitting the transmission of vibrations from the needle 5 to the tone arm 7, and thence by the direct mechanical connection to the region 9, to the loudspeaker 11. This is to be contrasted with prior art devices where slidable grease couplings have been disposed between the tone arm and the loudspeaker and thus at a location where the sound vibrations are remote from their strongest pick-up region at the needle. This is avoided in accordance with the present invention by a direct mechanical connection at 9.

The structure 7–5 is, in turn, held by an arm 4 pivotally attached at 6 to a support member 18. While the spring S is being tensioned and the tape record 1 rewound (by pulling the tab 2 and its drawstring 2'), a spring wire 22, connected about the pivot point 6 between the arm 4 and a fixed point 6' on the support 18, pushes the needle-holding arm 4 downward against stop 23 to align the needle 5 with the line of commencement points $P_1$, $P_2$, etc., of the record tape grooves $G_1$, $G_2$, etc. Depending upon the degree or extent of pulling of the tab 2, the tape 1 will be rewound to different longitudinal positions, such as $P_1$, $P_2$, etc., for engaging the commencement or beginning of the different grooves $G_1$, $G_2$, etc., containing, for example,different messages. With the successive longitudinal grooves thus having their commencements at different successive positions, $P_1$, $P_2$, etc.,longitudinally along the tape record 1, the extent of pulling of the tab 2 and its drawstring 2' allows for preselection of which commencement point $P_1$, $P_2$, etc., will be engaged by the needle 5, and thus which recorded message groove $G_1$, $G_2$,etc., is preselected. This may be determined by different color-coded or otherwise calibrated sections 20, 20', 20'',etc., of the tensioning drawstring 2', so that the user may preselect which message to play by the color or other calibration showing outside the toy or other instrument housing H.

If desired, the drive wheel 3 may be provided with an integral pulley P associated with a belt B that drives a shaft 25 of a conventional fly-ball or other speed governor G, which may be mounted at the bottom wall of the apparatus, as shown.

Further modification will occur to those skilled in the art and all such are considered to fall within the spirit and scope of the invention as defined in the appended claims.

What is claimed is:

1. Phonograph apparatus having, in combination, a longitudinally extending record tape provided with longitudinal record groove means; drive means for carrying the record tape under tension substantially linearly past a predetermined region in one longitudinal direction for record playing and in the opposite direction for record rewinding; spring means connected with the drive means for powering the same to carry the record tape in said one direction after tensioning of the spring means; sound -reproducing means; needle-holding means coupled to the sound-reproducing means during the record playing and having a needle adapted to engage said record tape; means at the said predetermined region for resiliently pressing the record tape into engagement with said needle during record playing;and means connected to the drive means for tensioning the spring means while causing the drive means to rewind the record tape in the said opposite direction, and for increasing the tension in said record tape during the tensioning of said spring means and causing the record tape to overcome the action of said resilient pressing means during the rewinding of the record tape to separate the record tape from the needle at the said predetermined region.

2. Apparatus as claimed in claim 1 and in which said drive means comprises a driving reel and a supply reel, said record tape having opposite ends thereof coupled to said reels, respectively, said spring means being connected to said driving reel, said means for tensioning said spring means comprising means for turning said supply reel to rewind said record tape thereon and causing said record tape to turn said driving reel and thereby store energy in said spring means.

3. Apparatus as claimed in claim 2, and in which said means for tensioning said spring means comprises a drawstring stored upon said supply reel and unwound from said supply reel during rewinding of said record tape.

4. Phonograph apparatus having, in combination, a longitudinally extending record tape provided with substantially parallel longitudinal record grooves having different commencement points at different positions along a longitudinal edge of said tape; drive means for carrying the record tape substantially linearly past a predetermined region in one longitudinal direction for record playing and in the opposite direction for record rewinding; spring means connected with the drive means for powering the same to carry the record tape in the said one direction after tensioning of the spring means; sound-reproducing means; needle-holding means coupled to the sound-reproducing means during the record playing and having a needle adapted to engage the record tape; means connected to the drive means for tensioning the spring means while causing the drive means to rewind the record tape in the said opposite direction, and for separating the needle from the record tape at the said predetermined region during the said spring-tensioning; means supporting said needle-holding means for movement transversely of said record tape; and spring means for automatically moving said needle-holding means to position the needle at said edge of the record tape when the needle is separated from the record tape and thereby to permit the needle to enter different recorded grooves depending upon the extent of operation of the tensioning means.

5. Apparatus as claimed in claim 4 and in which the tensioning means is provided with calibrating means for indicating different extents of operation of the tensioning means corresponding to said different positions of the commencement points of said grooves along said edge of the record tape.

* * * * *